United States Patent
Michels et al.

(10) Patent No.: US 12,301,451 B1
(45) Date of Patent: May 13, 2025

(54) ADAPTIVE TEMPORAL RESOURCE BINDING BASED ON SPECULATIVE PIPELINE INTERDEPENDENCY

(71) Applicant: F5, Inc., Seattle, WA (US)

(72) Inventors: Timothy S. Michels, Seattle, WA (US); Adam Huson, Seattle, WA (US); C. Stuart Johnson, Seattle, WA (US)

(73) Assignee: F5, INC., Seattle, WA (US)

( * ) Notice: Subject to any disclaimer, the term of this patent is extended or adjusted under 35 U.S.C. 154(b) by 103 days.

(21) Appl. No.: 17/572,348

(22) Filed: Jan. 10, 2022

(51) Int. Cl.
*H04L 45/42* (2022.01)
*G06F 9/30* (2018.01)
*H04L 9/08* (2006.01)
*H04L 45/00* (2022.01)

(52) U.S. Cl.
CPC .......... *H04L 45/42* (2013.01); *G06F 9/30079* (2013.01); *H04L 9/0825* (2013.01); *H04L 45/566* (2013.01)

(58) Field of Classification Search
CPC ..... H04L 45/42; H04L 9/0825; H04L 45/566; G06F 9/30079
USPC ........................................................ 709/219
See application file for complete search history.

(56) References Cited

U.S. PATENT DOCUMENTS

| | | | |
|---|---|---|---|
| 6,308,228 B1 * | 10/2001 | Yocum | G06F 13/387 710/316 |
| 9,191,315 B1 | 11/2015 | Mizrahi et al. | |
| 9,954,920 B1 * | 4/2018 | Paris | H04L 9/14 |
| 2003/0081600 A1 | 5/2003 | Blaker et al. | |
| 2003/0163589 A1 * | 8/2003 | Bunce | H04L 49/1546 709/250 |
| 2015/0341473 A1 * | 11/2015 | Dumitrescu | H04L 45/7453 370/392 |
| 2019/0305797 A1 * | 10/2019 | Peffers | H03M 7/6029 |
| 2020/0220746 A1 | 7/2020 | Shribman et al. | |
| 2023/0068914 A1 * | 3/2023 | Srinivasan | H04L 69/22 |

FOREIGN PATENT DOCUMENTS

WO        WO-9953646 A2 * 10/1999 ........... H04L 43/026

OTHER PUBLICATIONS

International Search Report and Written Opinion for PCT/US23/10043, dated Apr. 5, 2023.

* cited by examiner

*Primary Examiner* — Wing F Chan
*Assistant Examiner* — John Fan
(74) *Attorney, Agent, or Firm* — TROUTMAN PEPPER LOCKE LLP

(57) ABSTRACT

Technology related to adaptive temporal resource binding based on speculative pipeline interdependency is disclosed. In one example, a key is generated based on contents of a data item (such as a network packet received via a computer network). The key is used to determine whether another data item associated with the key is in a processing pipeline, of a plurality of processing pipelines. If another data item associated with the key is in one of the processing pipelines, then the data item is sent to that processing pipeline. If no other data item associated with the key is in any of the processing pipelines, the data item is sent based on available capacities of the processing pipelines. Subsequent data items associated with the same key are sent to the same pipeline so long as at least one data item associated with the key is still in the processing pipeline.

16 Claims, 10 Drawing Sheets

ADAPTIVE TEMPORAL RESOURCE BINDING BASED ON SPECULATIVE PIPELINE INTERDEPENDENCY

FIELD

This technology generally relates to data routing and distributed processing, and more specifically to network traffic distribution.

BACKGROUND

Some data processing applications can be scaled by processing multiple data items (such as network packets) concurrently and/or in parallel using a plurality of processors. Some such data processing applications can involve receiving multiple data items at a centralized processor and distributing the data items to multiple other processors for further processing. Various techniques exist for distributing data items to a plurality of processors. One such technique comprises randomly distributing data items across a plurality of processors. Another example technique comprises assigning data items to particular processors based on contents of the data items.

BRIEF SUMMARY

In an example embodiment, a system for routing network packets to a plurality of processing pipelines comprises a plurality of processing pipelines; a processor; and one or more computer-readable media comprising programmed instructions stored thereon. The system is configured to be capable of: generating a key based on contents of a network packet received via a network; determining whether another network packet associated with the key is in a processing pipeline, of the plurality of processing pipelines; sending the network packet to the processing pipeline, of the plurality of processing pipelines, if another network packet associated with the key is in the processing pipeline, of the plurality of processing pipelines; and otherwise, sending the network packet based on available capacities of the plurality of processing pipelines.

In another example embodiment, a computer-implemented method for sending data items to a plurality of processing pipelines comprises generating a key based on contents of a data item received at a computing device connected to a plurality of processing pipelines; determining whether another data item associated with the key is in a processing pipeline, of the plurality of processing pipelines; sending the data item to the processing pipeline, of the plurality of processing pipelines, if another data item associated with the key is in the processing pipeline, of the plurality of processing pipelines; and otherwise, sending the data item based on available capacities of the plurality of processing pipelines.

Another example embodiment comprises a non-transitory computer readable medium having stored thereon instructions comprising executable code that, when executed by one or more processors, causes the one or more processors to perform operations comprising: generating a key based on contents of a network packet received via a computer network; determining whether another network packet associated with the key is in a processing pipeline, of a plurality of processing pipelines; sending the network packet to the processing pipeline, of the plurality of processing pipelines, if another network packet associated with the key is in the processing pipeline, of the plurality of processing pipelines; and otherwise, sending the network packet based on available capacities of the plurality of processing pipelines.

In another example embodiment, an apparatus comprises a processor and one or more computer-readable media comprising programmed instructions stored thereon, the apparatus configured to be capable of executing the programmed instructions to: generate a key based on contents of a network packet received via a computer network; determine whether another network packet associated with the key is in a processing pipeline, of a plurality of processing pipelines; send the network packet to the processing pipeline, of the plurality of processing pipelines, if another network packet associated with the key is in a processing pipeline, of the plurality of processing pipelines; and otherwise, send the network packet based on available capacities of the plurality of processing pipelines.

DETAILED DESCRIPTION

Figure 1:
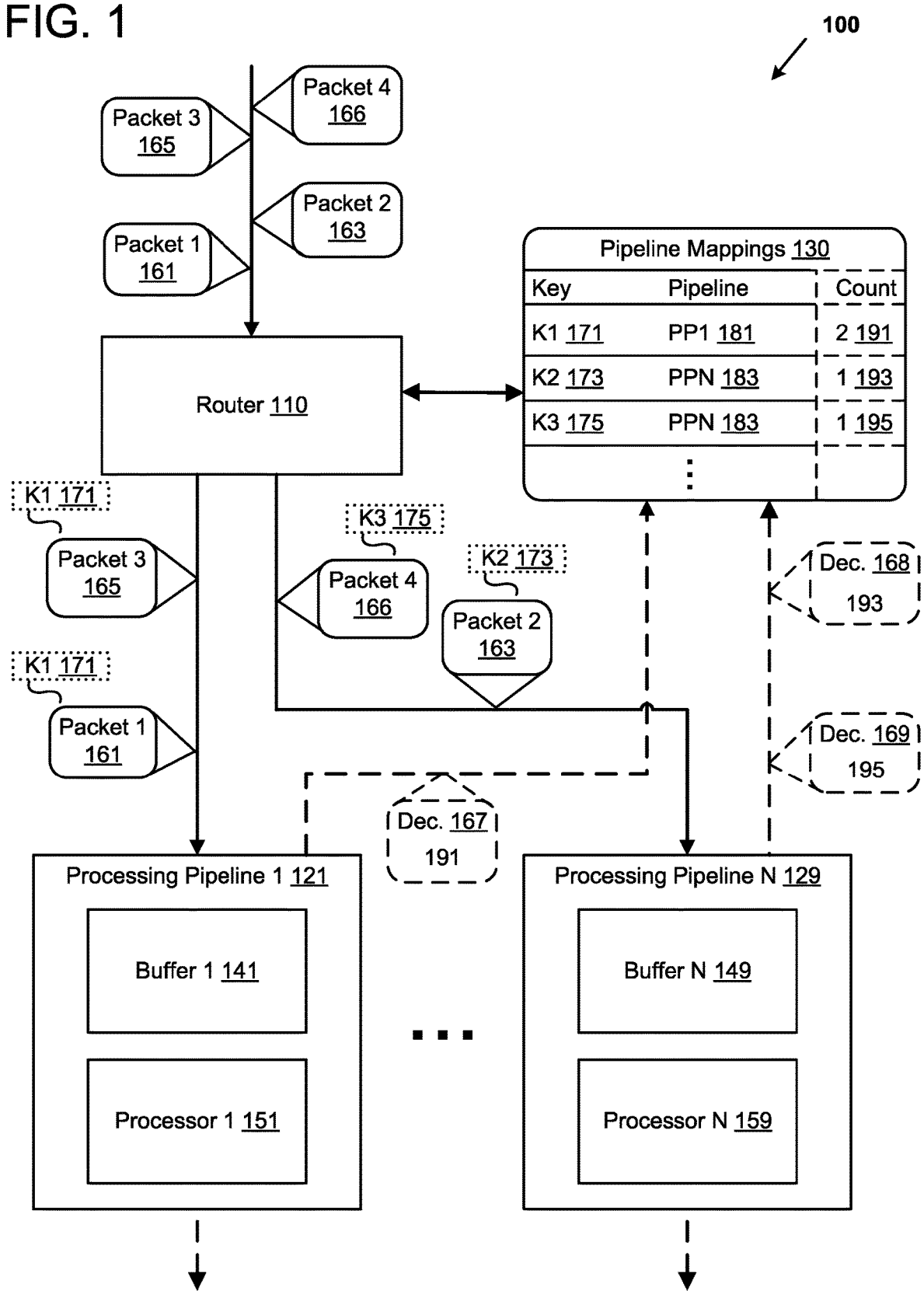
FIG. 1 is a block diagram of an example system for adaptive temporal resource binding of network packets to a plurality of processing pipelines.

Various techniques exist for distributing data items (such as network packets) to a plurality of processing pipelines. For example, data items can be assigned to particular processing pipelines based on contents of the data items. Such a technique can have an advantage, at least in some cases, of ensuring that related data items (such as network packets that are part of a same sequence or data stream) are sent to a same processing pipeline. However, in some scenarios this technique can result in overloading certain processing pipelines. For example, binding data items to processing pipelines based on contents of the data items can cause disproportionate numbers of data items to be sent to the processing pipelines. This can result in some processing pipelines becoming overloaded while other processing pipelines remain underutilized. This utilization disparity can be addressed by sending data items to underutilized processing pipelines instead of binding the data items to specific pipelines based on their contents. However, that approach gives up the advantage of having related data items processed by the same processing pipeline.

At least some of the techniques described herein can address these problems by temporally binding related data items to processing pipelines. For example, a key can be generated based on contents of a data item (such as a network packet received via a computer network). The key can be used to determine whether one or more other data items associated with the key is/are in a processing pipeline, of a plurality of processing pipelines. If another data item associated with the key is in one of the processing pipelines, then the data item can be sent to that processing pipeline. However, if no other data item associated with the key is in any of the processing pipelines, then a processing pipeline with a highest available capacity can be selected and the data item can be sent to that pipeline. Subsequent data items that are associated with the same key can be sent to the same processing pipeline so long as at least one data item associated with the key is already in that pipeline. After no more data items associated with the key are in the pipeline, then the process can repeat and, when another data item associated with the key is received, another processing pipeline can be selected to process the data item. Thus, a flow of related data items (such as a stream of related network packets) can be temporally bound to a given processing pipeline until the flow of related data items have all been processed. If additional, related data items are subsequently received they can be bound to a different processing pipeline if it has a greater available capacity.

As the term is used herein, a processing pipeline comprises a processing element (processor) to which data items can be transmitted for processing. A processing pipeline can comprise a processor and a buffer associated with the processor. The buffer can comprise a queue, a stack, an array, or any other suitable data structure stored in a storage of a computing device (such as a register, cache, memory, hard drive, solid state drive, etc.). The type of data structure selected for the buffer can be based on a processing order that is desirable for the processor of the processing pipeline. For example, a queue data structure can be used to support a first-in first-out (FIFO) processing order, a stack data structure can be used to support a last-in first-out (LIFO) processing order, an array data structure can be used to support a random-access processing order, etc.

In at least some embodiments, the units of data that are processed by processing pipelines can comprise network packets. For example, network packets can be written to a buffer of a processing pipeline and the processor of the pipeline can be used to perform operations on network packets that are written to its buffer. For example, the processor of the processing pipeline can be used to rewrite packet headers, route packets to other computing devices in a computer network, perform quality of service (QoS) operations for network packets (such as rate limiting and prioritization), etc.

In some scenarios, multiple data units (such as network packets, pixels, data blocks, audio samples, video samples, etc.) can be distributed to multiple processing pipelines for parallel and/or concurrent processing. In some embodiments, multiple processing pipelines can be implemented in a single computing device (such as a single network traffic management apparatus). Additionally or alternatively, multiple processing pipelines can be implemented on multiple computing devices. In a particular embodiment, processing pipelines comprise network packet processing cores of one or more network traffic management apparatuses.

The buffers of the processing pipelines can be logically separated. For example, the buffers can comprise different portions of a memory, such as a RAM. Additionally or alternatively, the buffers can be physically separated. For example, the buffers can comprise different memory modules that can be accessed independently by processors of the processing pipelines.

As the term is used herein, a network packet is a data structure comprising data organized according to one or more network protocols. Different protocols can be associated with different layers of the network packet. The layers within a network packet can be described using a model, such as the Open Systems Interconnection (OSI) model, that partitions a communication system into multiple layers. For example, the OSI model partitions a communication system into seven layers. The OSI model is one example of how functions of a communication system can be partitioned into abstraction layers, but other models can be used. Lower-level layers (e.g., layers 1-3) within the network stack can be used to manage voltage signaling and basic transport of the network traffic while higher-level layers (e.g., layer 7) can be used to convey application data. Another example model is the Internet Protocol Suite, which partitions a communication system into four layers. A network packet organized according to the Internet Protocol Suite can comprise an internet layer organized according to the Internet Protocol (IP), a transport layer organized according to a transport protocol (such as the User Datagram Protocol (UDP) or the Transmission Control Protocol (TCP), and an application layer organized according to an application protocol (such as the Hypertext Transfer Protocol (HTTP).

As the term is used herein, a router comprises software and/or hardware components of a computing device configured to receive data items (such as network packets) and to transmit the received data items to one or more other components. A router can transmit data items to components of a same computing device or to one or more other computing devices. In some embodiments, the router can comprise one or more hardware and/or software components of a network traffic management apparatus.

A computing device can include one or more processor(s), one or more communication interface(s), and one or more memories. A processor, communication interface, and memory can be coupled together with an interconnect so that components of a computer apparatus can communicate with each other using the interconnect. The communication interface can be used to send and receive communications (e.g., network packets) with other computing devices, such as a client and an application server. A processor can be used to execute computer-executable instructions that are stored in memories and/or storage resources. The computer-executable instructions can be organized into software routines (also referred to as modules or components) comprising executable code to perform various computing tasks. Various organizations of routines are possible. For example, routines can be sub-divided into smaller routines and/or combined into larger routines. A memory can also include structured and/or unstructured data that are used by the software routines to perform the computing tasks.

FIG. 1 is a block diagram of an example system 100 for adaptive temporal resource binding of network packets (e.g., 161-166) to a plurality of processing pipelines 121-129. The example system 100 comprises a router 110 and the plurality of processing pipelines 121-129. The router 110 can receive a plurality of network packets 161-166 and can send the network packets 161-166 to the plurality of processing pipelines 121-129. In at least some embodiments, the router 110 comprises one or more processors and one or more computer-readable media comprising programmed instructions stored thereon for causing the processor to perform operations as described herein. Additionally or alternatively, the router 110 can comprise one or more programmable hardware components (such as a Field Programmable Gate Array (FPGA), a System On a Chip (SOC), etc.).

The router 110 can receive the network packets 161-166 via one or more wired and/or wireless communication channels. In at least some embodiments, the router 110 can receive one or more network packets via one or more computer networks, such as a wide area network, a local area network, or some combination thereof. After receiving a network packet, the router 110 can generate a key (e.g., 171, 173, 175, etc.) based on contents of the network packet. The key can be generated, for example, using data in one or more headers of the network packet. Additionally or alternatively, the key can comprise a hash value based on contents of the network packet. Such a key can be generated using a hashing algorithm (MD, SHA1, SHA256, etc.). In at least some embodiments, the key can be generated using a hashing algorithm designed to create a number of keys that is greater than or equal to the number of the processing pipelines 121-129.

The router 110 can determine whether another network packet that is associated with the generated key is in a processing pipeline, of the plurality of processing pipelines 121-129. In at least some embodiments, the determining can be performed using one or more pipeline mappings 130. For example, a counter (e.g., 191, 193, 195) associated with the key can be incremented when a network packet associated with the key is sent to a processing pipeline, of the plurality of processing pipelines 121-129. The counter can then be decremented after the network packet (e.g., 167, 168, 169) associated with the key is processed by the processing pipeline, of the plurality of processing pipelines 121-129. In such an embodiment, determining whether another network packet associated with the key is in a processing pipeline, of the plurality of processing pipelines 121-129, can be based on a value of the counter associated with the key. For example, if a value of the counter is greater than zero then it can be determined that another network packet associated with the key is in a processing pipeline, of the plurality of processing pipelines 121-129. However, if the value of the counter is equal to zero (or if a counter associated with the key does not exist), then it can be determined that no network packet associated with the key is in any of the plurality of processing pipelines 121-129.

If another network packet associated with the key is in a processing pipeline, of the plurality of processing pipelines 121-129, then the router 110 can send the network packet to that processing pipeline. Otherwise, the router 110 can send the network packet based on available capacities of the plurality of processing pipelines 121-129. For example, the plurality of processing pipelines 121-129 can comprise a plurality of buffers 141-149 and a plurality of processors 151-159. Sending the network packet based on available capacities of the processing pipelines 121-129 can comprise identifying a processing pipeline, of the plurality of processing pipelines 121-129, with a buffer containing a fewest number of network packets with respect to other processing pipelines, of the plurality of processing pipelines 121-129.

In the example scenario depicted in FIG. 1, a network packet 161 is received by the router 110. The router 110 generates a key 171 based on contents of the network packet 161 and determines that an entry for the key 171 does not yet exist in the pipeline mappings 130. The router 110 creates an entry for the key 171 in the pipeline mappings 130 and selects a processing pipeline, of the plurality of processing pipelines 121-129, to which the network packet 161 will be sent. The selection can be based on available capacities of the plurality of processing pipelines 121-129. For example, the router 110 can select a processing pipeline based on available capacities of the buffers 141-149. In the example depicted in FIG. 1, the router 110 selects the processing pipeline 121 and creates an entry 181 in the pipeline mappings 130 that associates the key 171 with the processing pipeline 121. The router 110 also creates a counter 191 associated with the key 171 and sets it to a value of one. The router 110 then sends the network packet 161 to the processing pipeline 121.

In the example scenario depicted in FIG. 1, the router 110 then receives the network packet 163. The router 110 generates a key 173 based on contents of the network packet 163 and determines that an entry for the key 173 does not yet exist in the pipeline mappings 130. The router 110 creates an entry for the key 173 in the pipeline mappings 130 and selects a processing pipeline, of the plurality of processing pipelines 121-129, to which the network packet 163 will be sent. In the example depicted in FIG. 1, the router 110 selects the processing pipeline 129. This selection can be based, for example, on a determination that the buffer 141 contains the network packet 161 and that no network packets are currently in the buffer 149. The router 110 creates an entry 183 in the pipeline mappings 130 that associates the key 173 with the processing pipeline 129. The router 110 also creates a counter 193 associated with the key 173 and sets it to a value of one. The router 110 then sends the network packet 163 to the processing pipeline 129.

In the example scenario depicted in FIG. 1, the router 110 then receives the network packet 165. The router 110 generates the key 171 based on contents of the network packet 165. The router 110 identifies the entry for the key 171 in the pipeline mappings 130 and determines that the key 171 is associated with the processing pipeline 121. The router 110 then increments the counter 191 that is associated with the key 171 from a value of one to a value of two and sends the network packet 165 to the processing pipeline 121.

In the example depicted in FIG. 1, the router 110 then receives the network packet 166. The router 110 generates a key 175 based on contents of the network packet 166 and determines that an entry for the key 175 does not yet exist in the pipeline mappings 130. The router 110 creates an entry for the key 175 in the pipeline mappings 130 and selects a processing pipeline, of the plurality of processing pipelines 121-129, to which the network packet 163 will be sent. In the example depicted in FIG. 1, the router 110 selects the processing pipeline 129. This selection can be based, for example, on a determination that the buffer 141 contains two network packets (network packets 161 and 165), and that the buffer 149 contains one network packet (network packet 163). The router 110 adds the entry 183 in the pipeline mappings 130 for the key 175 to associate the key 175 with the processing pipeline 129. The router 110 also creates a counter 195 associated with the key 175 and sets it to a value of one. The router 110 then sends the network packet 166 to the processing pipeline 129.

In at least some scenarios, the fact that network packets resolve to a same key (e.g., network packets 161 and 169 both resolve to the key 171) can indicate that the network packets are related to one another. For example, the network packets may be received from a same source and/or may contain data of a same data stream. However, it is possible in some scenarios for network packets that are not related to resolve to a same key. For example, an algorithm for generating the keys (such as a hashing algorithm) may be selected which ensures that related network packets resolve to a same key but that does not guarantee that unrelated packets will not share the same key. The term "collision" may be used to refer to a scenario where unrelated data items (such as network packets) resolve to a same key. In the case of hashing algorithms, the size of the keys generated by a hashing algorithm can indicate a likelihood that a collision will occur when the hashing algorithm is used. For example, a hashing algorithm that generates shorter keys may be more likely to produce collisions than a hashing algorithm that generates longer keys. However, the hashing algorithm that generates shorter keys may generate its keys faster than the hashing algorithm that generates longer keys or may use fewer physical resources. Thus, the hashing algorithm that generates shorter keys may require fewer computation and/or storage resources than the hashing algorithm that generates longer keys. In at least some scenarios, the selection of an appropriate hashing algorithm for key generation can be based on the number of processing pipelines, the available compute resources, the available memory and/or storage resources, and throughput requirements.

Optionally, counters associated with keys in the pipeline mappings 130 can be decremented after certain criteria have been satisfied. Example criteria include detecting that processing of network packets has been completed by the processing pipelines 121-129. For example, the counter 191 can be decremented after the processing pipeline 121 completes processing of the network packet 161. The counter 191 can be decremented again after the processing pipeline 121 completes processing of the network packet 165. The counter 193 can be decremented after the processing pipeline 129 completes processing of the network packet 163. Similarly, the counter 195 can be decremented after the processing pipeline 129 completes processing of the network packet 166. In at least some embodiments, the processors 151-159 of the processing pipelines 121-129 can decrement counters associated with keys after the processors 151-159 process network packets associated with the keys. For example, the processor 151 can perform a decrement operation 167 targeting the counter 191. For example, the processor 159 can perform a decrement operation 168 targeting the counter 193 and can perform a decrement operation targeting the counter 195. Additionally or alternatively, the router 110 can decrement counters associated with the keys after network packets associated with the keys are processed by the processing pipelines 121-129.

Additionally or alternatively, counters associated with the keys can be decremented using a fixed-delay approach. For example, a counter can be automatically decremented after a specified amount of time (such as 1 µs, 1 ms, etc.) has elapsed since a network packet was transmitted to a processing pipeline associated with the counter. Such an approach can be beneficial in at least some situations where processing time (or approximate processing time) is known in advance, and/or a communication latency involved in signaling processing completion is sufficiently high that additional efficiencies may be gained by leveraging known operating characteristics of the system.

In an example embodiment, the system 100 can be implemented using a client-server architecture as described in more detail with reference to FIG. 6, where the different components (e.g., 110, 121-129, 130) of the client-server architecture can be implemented using a computing environment as described in more detail with reference to FIG. 7.

Figure 2:
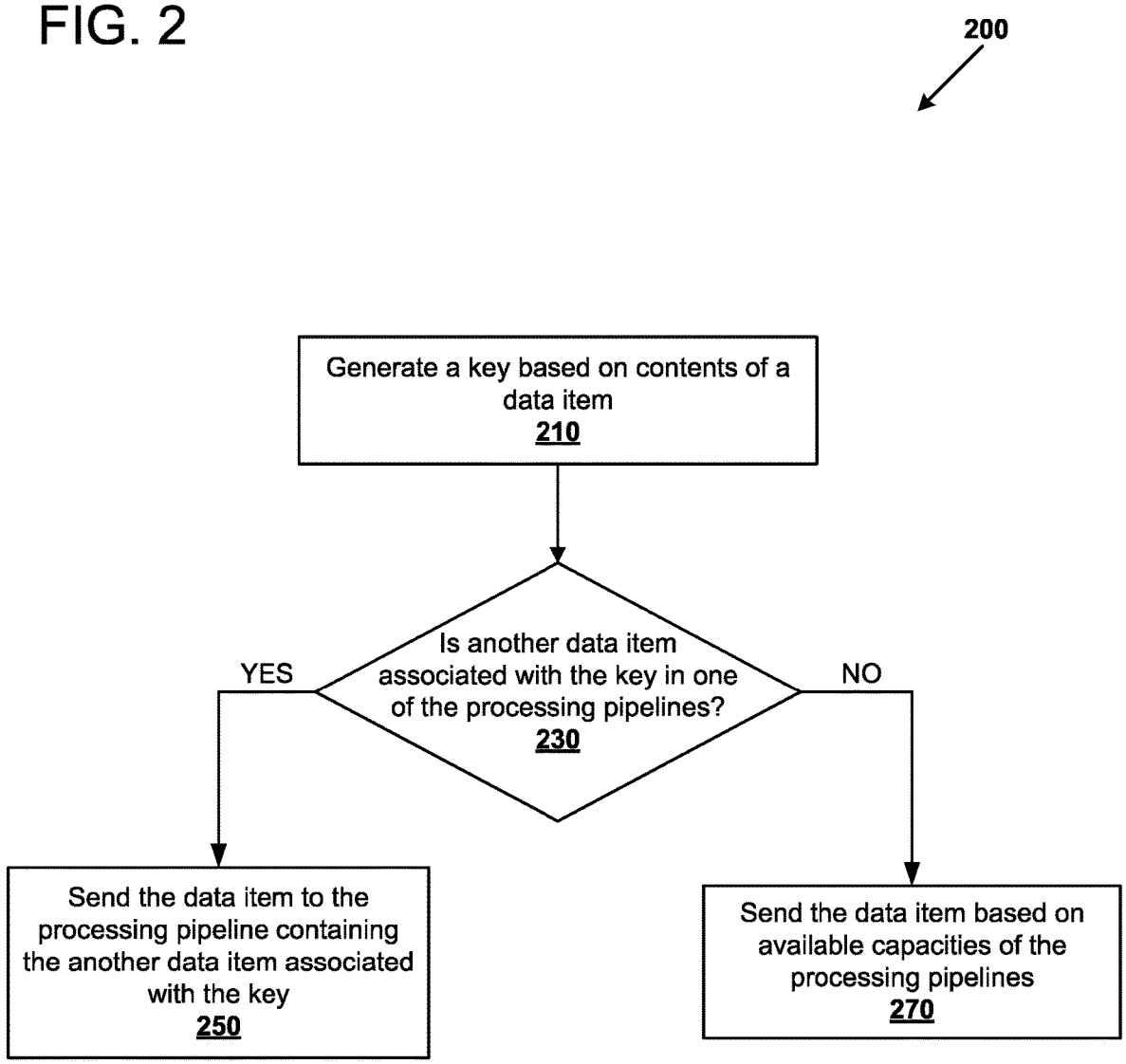
FIG. 2 is a flowchart of an example method for adaptive temporal resource binding of data items to a plurality of processing pipelines.

FIG. 2 is a flowchart of an example method 200 for adaptive temporal resource binding of data items to a plurality of processing pipelines. Any of the example computing devices or systems described herein can be used to perform the example method 200. As one example, the example network traffic management apparatus 310 can be used to perform all or part of the example method 200. For example, computer-executable instructions for carrying out the method 200 can be stored in computer-readable memory (e.g., the memory 330 depicted in FIG. 3) and the instructions can be executed by one or more processor(s) (e.g., the processor(s) 315 depicted in FIG. 3) to perform the method 200. As another example, the example system 100 depicted in FIG. 1 can be used to perform all or part of the example method 200.

Figure 3:
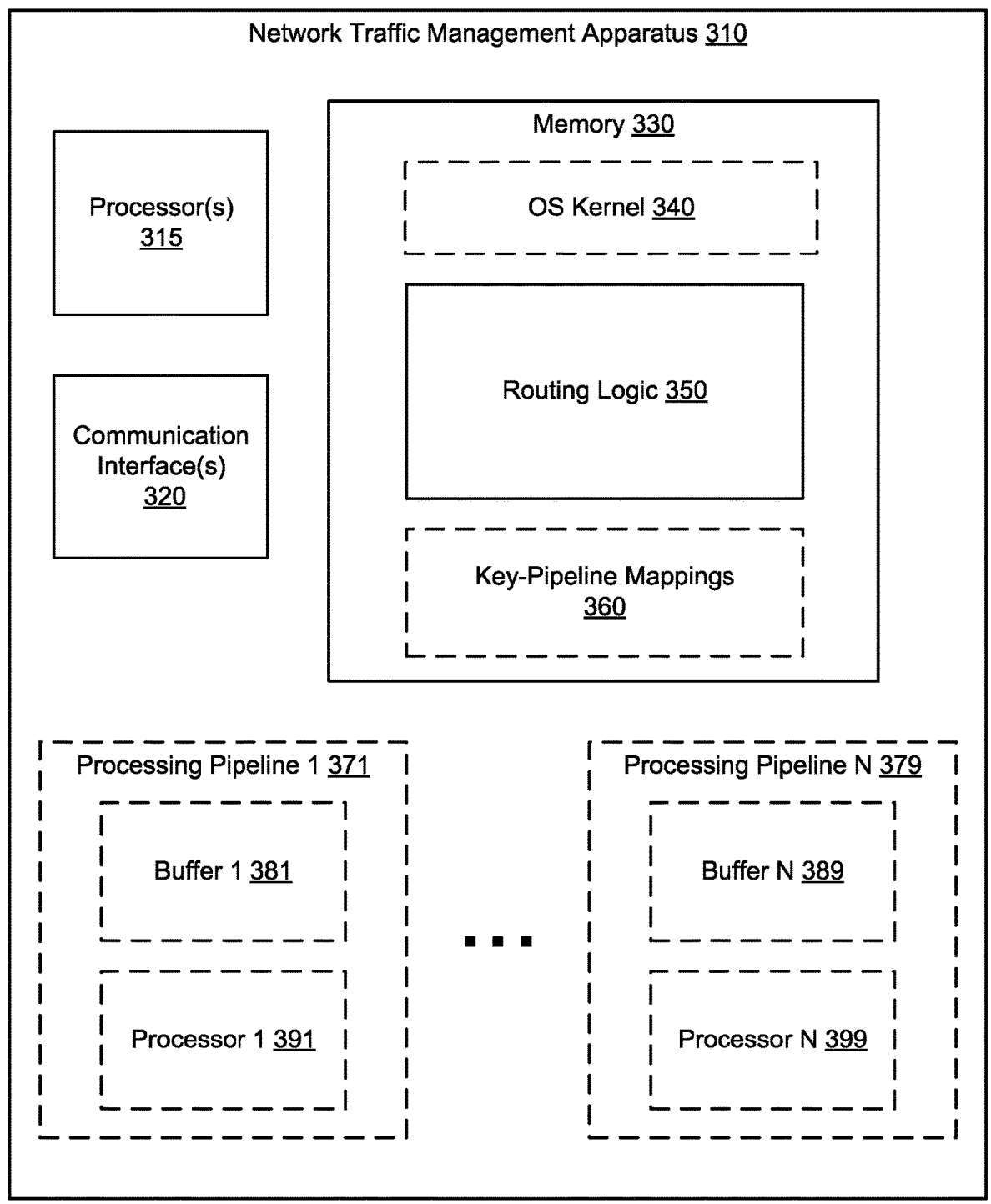
FIG. 3 is a block diagram of an example network traffic management apparatus for adaptive temporal resource binding of data items to a plurality of processing pipelines.

FIG. 3 is a block diagram of an example network traffic management apparatus 310 for adaptive temporal resource binding of data items to a plurality of processing pipelines (e.g., 371-379). The network traffic management apparatus 310 comprises one or more processors 315, one or more communication interfaces 320, and a memory 330. The memory 330 comprises routing logic 350 comprising instructions that, when executed by one or more of the processor(s) 315, cause the network traffic management apparatus 310 to perform operations for adaptive temporal resource binding of data items as described herein. Optionally, the network traffic management apparatus 310 can comprise a plurality of processing pipelines 371-379. Additionally or alternatively, the network traffic management apparatus 310 can be connected to a plurality of processing pipelines that are external to the network traffic management apparatus 310. Such processing pipelines can comprise buffers for storing data items (e.g., 381-389) and processors (e.g., 391-399) that can be used to perform operations using data item stored in the associated buffers. Optionally, the memory 330 of the network traffic management apparatus 310 can comprise an operating system kernel 340 that can be used to manage execution of the routing logic 350 and/or mediate access by the routing logic to the communication interface(s) 320 and/or the processing pipelines 371-379. The network traffic management apparatus 310 can be implemented using a computing environment as described in more detail with reference to FIG. 7.

At 210, a key is generated based on contents of a data item. The data item can be received at a computing device connected to a plurality of processing pipelines. For example, the data item can be received via one or more of the communication interface(s) 320 of the network traffic management apparatus 310. The data item can be a network packet received via one or more computer networks to which one or more of the communication interface(s)320 is/are connected. The routing logic 350 of the network traffic management apparatus 310 can be used to generate a key based on contents of a data item. Generating the key can comprise using a hashing algorithm to generate a hash value based on contents of the data item. In at least some embodiments, the data item comprises a network packet. In such an embodiment, generating the key can comprise generating an identifier based on data in one or more heaters of the network packet.

At 230, it is determined whether another data item associated with the key is in a processing pipeline, of the plurality of processing pipelines. For example, the network traffic management apparatus 310 can determine whether another data item associated with the key is in a processing pipeline, of the plurality of processing pipelines 371-379. In at least some embodiments, the determining can be performed using key-pipeline mappings 360. For example, when a key is generated based on contents of a data item, the key-pipeline mappings 360 can be inspected to determine whether an entry for the key exists. An entry in the key-pipeline mappings 360 can be used to associate the key with one of the processing pipelines 371-379. The association of the key with a particular pipeline can be effective for as long as one or more data items associated with the key are being processed by the pipeline. Once no more data items associated with the key are in the pipeline, the association between the key and the processing pipeline can be broken. If additional data items associated with the key are subsequently received, a different processing pipeline, of the plurality of processing pipelines 371-379, can be associated with the key and can be used to process the additional data items.

Determining whether another data item is in one of the processing pipelines 371-379 can comprise inspecting a value of a counter associated with the key. In some embodiments, the counter can be stored as part of an entry for the key in the key-pipeline mappings 360. The counter can be incremented when a data item associated with the key is sent to a processing pipeline, of the plurality of processing pipelines 371-379. The counter can then be decremented after the data item associated with the key is processed by the processing pipeline, of the plurality of processing pipelines 371-379. Determining whether another data item associated with the key is in a processing pipeline, of the plurality of processing pipelines 371-379, can be based on the current value of the counter associated with the key. For example, if the value of the counter is greater than zero then it can be determined that another data item associated with the key is in a processing pipeline, of the plurality of processing pipelines 371-379. However, if the value of the counter is equal to zero (or if an entry for the key is not present in the key-pipeline mappings 360), then it can be determined that no data items associated with the key are in any of the plurality of processing pipelines 371-379.

If another data item associated with the key is in a processing pipeline, of the plurality of processing pipelines, then at 250 the data item is sent to that processing pipeline. For example, the network traffic management apparatus 310 can send the data item to one of the plurality of processing pipelines 371-379 to which it is connected. An entry for the key in the key-pipeline mappings 360 can include an identifier for one of the plurality of processing pipelines 371-379. The pipeline associated with the key can be identified using the identifier. Sending the data item to the processing pipeline associated with the key can comprise transmitting the data item to the processing pipeline using one or more wired and/or wireless communication channels. For example, the network traffic management apparatus 310 can send the data item to a buffer (e.g., 381) of the processing pipeline (e.g., 371). Data items written to a buffer of a processing pipeline can be processed using a processor (e.g., 391) of the processing pipeline.

If no other data item associated with the key is in a processing pipeline, of the plurality of processing pipelines, then at 270 the data item is sent based on available capacities of the plurality of processing pipelines. For example, the network traffic management apparatus 310 can send the data item to one of the plurality of processing pipelines 371-379 based on available capacities of the plurality of processing pipelines 371-379. Sending the data item based on available capacities of the processing pipelines 371-379 can comprise identifying a processing pipeline, of the plurality of processing pipelines 371-379, with a buffer (e.g., 381) containing a fewest number of data items with respect to other processing pipelines, of the plurality of processing pipelines 371-379; and then sending the data item to the identified processing pipeline (e.g., 371).

Figure 4:
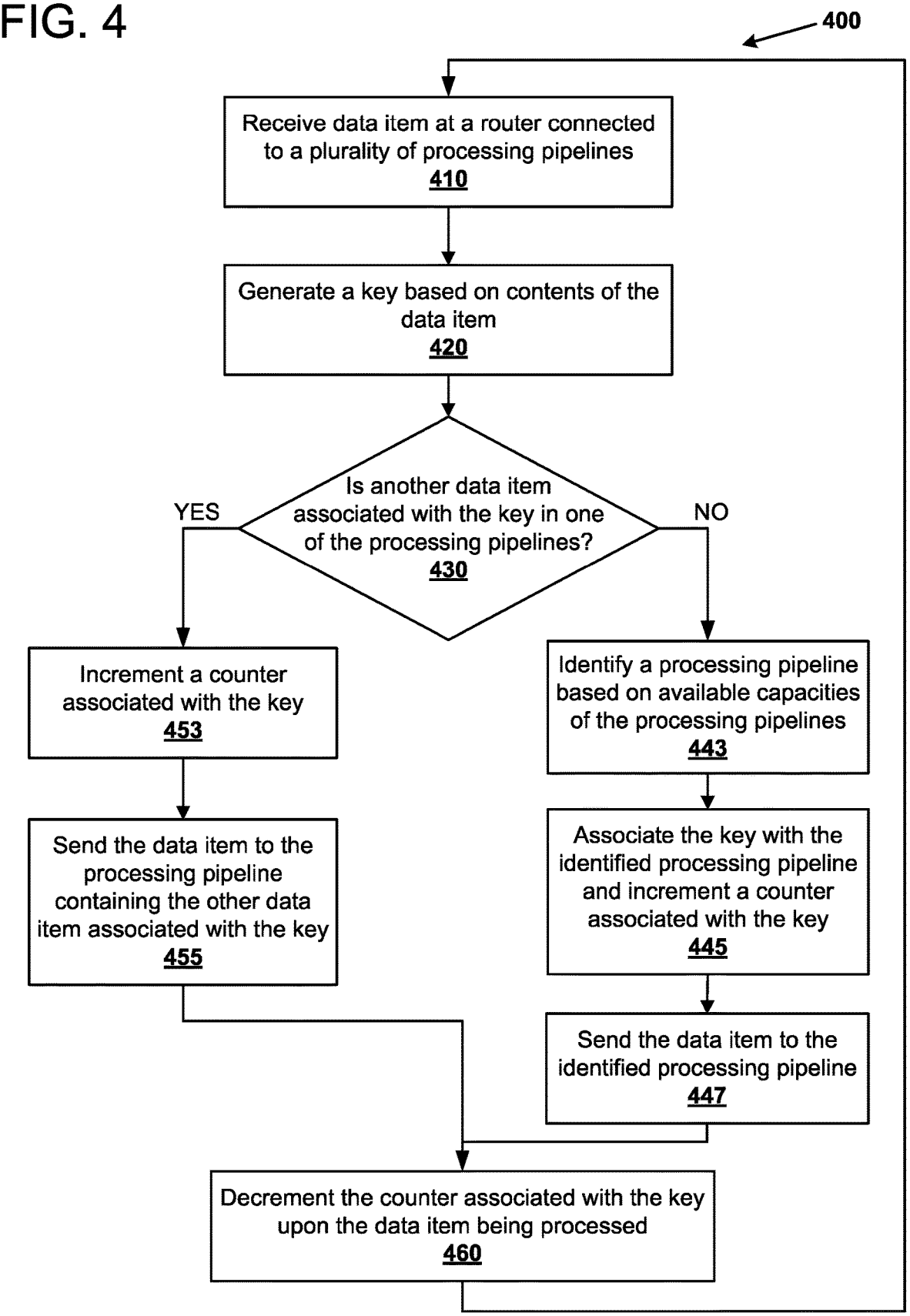
FIG. 4 is a flowchart of another example method for adaptive temporal resource binding of data items to a plurality of processing pipelines.

FIG. 4 is a flowchart of an example method 400 for adaptive temporal resource binding of data items to a plurality of processing pipelines. The method 400 can be implemented using any of the example computing devices or systems described herein. As one example, the example network traffic management apparatus 310 can be used to perform all or part of the example method 400. For example, computer-executable instructions for carrying out the method 400 can be stored in computer-readable memory (e.g., the memory 330 depicted in FIG. 3) and the instructions can be executed by one or more processor(s) (e.g., the processor(s) 315 depicted in FIG. 3) to perform the method 400. As another example, the example system 100 depicted in FIG. 1 can be used to perform all or part of the method 400. As another example, the example system 500 depicted in FIGS. 5A-D cam be used to perform all or part of the method 400.

FIGS. 5A-D are block diagrams of an example system 500 for adaptive temporal resource binding of data items. The example system 500 comprises a router 510, a plurality of processing pipelines 521-523, and pipeline mappings 530. In some embodiments, the router 510, processing pipelines 521 and 523, and pipeline mappings 530 can be parts of a single computing device. Alternatively, the components can be distributed across multiple computing devices. For example, the router 510 and pipeline mappings 530 can be included in one computing device and the processing pipelines 521 and 523 can comprise additional computing devices.

Referring to FIG. 4, at 410 a data item is received at a router connected to a plurality of processing pipelines. For example, in the scenario depicted in FIG. 5A, the router 510 receives a data item 561. The data item 561 can be received by the router 510 via one or more wired and/or wireless communication channels, such as one or more wired and/or wireless computer networks.

At 420, a key is generated based on contents of the data item. For example, in the scenario depicted in FIG. 5A, the router 510 generates a key 571 based on contents of the data item 561. The key 571 can be generated by creating an alphanumerical identifier (such as a hash) based on one or more data values contained within the data item 561. In an embodiment where the data item 561 comprises a network packet, the key 571 can be generated based on contents of one or more packet headers of the network packet (such as a source IP address, a source port number, a destination IP address, a destination port number, a protocol identifier, etc.).

At 430, it is determined whether another data item associated with the key is in one of the processing pipelines. For example, in the scenario depicted in FIG. 5A, the router 510 determines whether another data item associated with the key 571 is in one of the processing pipelines 521-523. The determining can comprise determining whether a counter associated with the key exists and has a value greater than zero. For example, the router 510 can search for a counter (e.g., 591) associated with the key 571.

If it is determined that no data item associated with the key is in any of the processing pipelines, then at 453, one of the processing pipelines is identified based on available capacities of the plurality of processing pipelines. For example, in the scenario depicted in FIG. 5A, the router 510 determines that no data item associated with the key 571 is in any of the processing pipelines 521-523 and identifies the processing pipeline 521 based on available capacities of the processing pipelines 521-523. The identifying can comprise determining available capacities of the buffers of the plurality of processing pipelines. For example, the router 510 can determine that the buffer 541 of the processing pipeline 521 contains a fewest number of data items with respect to the other processing pipelines (e.g., 523) of the plurality of processing pipelines 521-523. In the particular scenario depicted in FIG. 5A, the router 510 determines that the buffer 541 does not contain any other data items and, based on that determining, identifies it as a candidate pipeline to be associated with the key 571.

At 445, the key is associated with the identified processing pipeline and the counter associated with the key is incremented. For example, in the scenario depicted in FIG. 5A, the router 510 creates an entry in the pipeline mappings 530 that associates the key 571 with the processing pipeline 521. The router 510 also creates a counter 591 associated with the key 571 and sets the counter 591 to a value of one. Although the counter 591 is depicted as being part of the entry for the key 571 in the pipeline mappings 530, it is also possible for the counter 591 to be stored separately.

At 447, the data item is sent to the identified processing pipeline. For example, in the scenario depicted in FIG. 5A, the router 510 sends the data item 561 to the processing pipeline 521. Sending the data item 561 to the processing pipeline 521 can comprise writing the data item 561 to the buffer 541 of the processing pipeline 521. Additionally or alternatively, sending the data item 521 to the processing pipeline 521 can comprise transmitting the data item 561 to the processing pipeline 521 via one or more wired and/or wireless communication channels (such as one or more buses, one or more networks, etc.).

If, at 430, it is determined that another data item associated with the key is in one of the processing pipelines then, at 453, a counter associated with the key is incremented. For example, in the scenario depicted in FIG. 5B, another data item 562 is received by the router 510, the router 510 generates the key 571 based on the contents of the data item 562, and the router 510 determines that another data item associated with the key 571 (data item 561) is in one of the processing pipelines (processing pipeline 521). Determining that the data item 561 is already in the processing pipeline 521 can be based on a search of the pipeline mappings 530. The router 510 can search the pipeline mappings 530 and locate the previously created entry for the key 571. The entry for the key 571 can be inspected to determine that the key 571 is associated with the processing pipeline 521. The value of the counter 591 (which is equal to one) can be analyzed to determine that another data item (561) is in the processing pipeline 521. After determining that the data item 561 is already in the processing pipeline 521, the counter 591 is incremented by the router 510 (increasing the value from one to two).

At 455, the data item is sent to the processing pipeline containing the other data item associated with the key. For example, in the scenario depicted in FIG. 5B, the router 510 sends the data item 562 to the processing pipeline 521 that contains the other data item 561 that is associated with the key 571. Sending the data item 562 to the processing pipeline 521 can comprise writing the data item 562 to the buffer 541 of the processing pipeline 521.

At 460, upon the data item being processed by the processing pipeline, the counter associated with the key is decremented. For example, in the example scenario depicted in FIG. 5C, the counter 591 is decremented via a decrement operation 564 after the data item 561 is processed and the counter 591 is decremented again via another decrement operation 566 after the data item 562 is processed. In at least some embodiments, the counter can be decremented by a processor of the processing pipeline. For example, the processor 551 of the processing pipeline 521 can decrement the counter 591 after processing the data item 561. Additionally or alternatively, the counter can be decremented by one or more other processors. For example, a processor of the router 510 (not shown) can be used to decrement the counter 591 after detecting that processing of the data item 561 is complete.

The method 400 can be repeated as additional data items are received. For example, in the scenario depicted in FIG. 5B, another data item 563 is received by the router 510. A different key 573 is generated based on the contents of the data item 563, and the router 510 determines that another data item associated with the key 573 is not in any of the processing pipelines 521-523. The determination can comprise determining that an entry for the key 573 does not exist in the pipeline mappings 530.

Figure 5A:
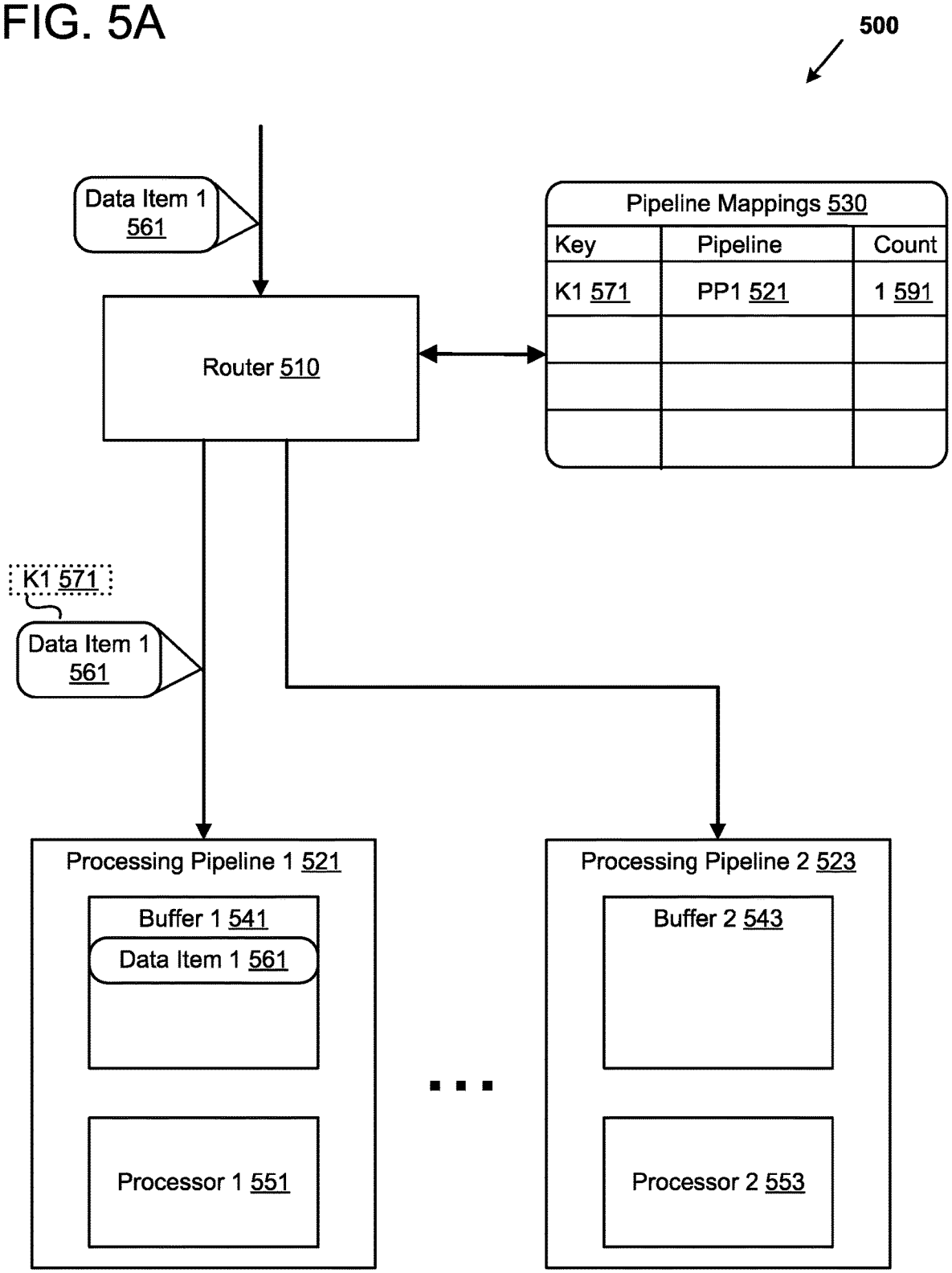
FIGS. 5A-D are block diagrams of an example system for adaptive temporal resource binding of data items.
Figure 5B:
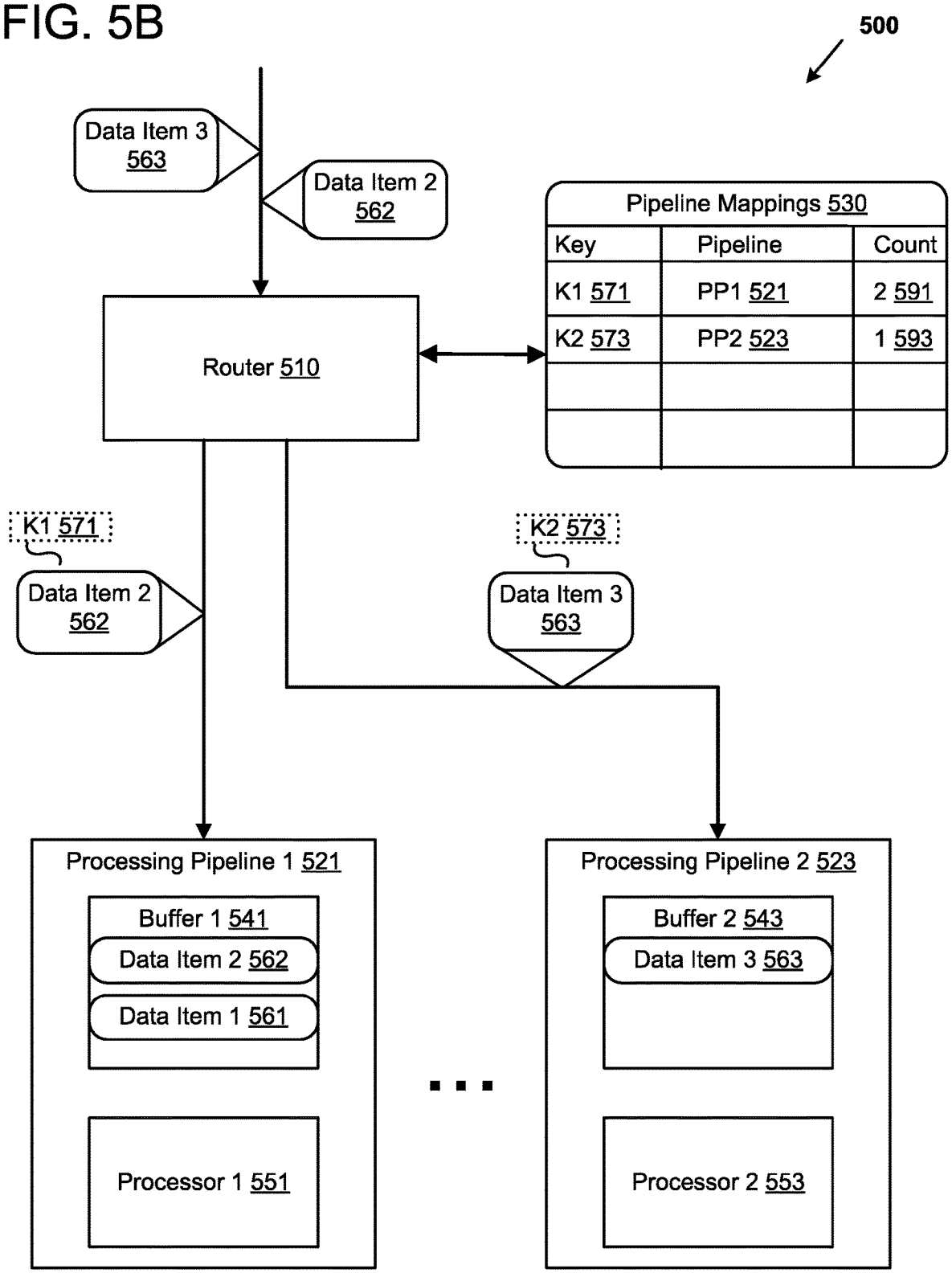
Figure 5C:
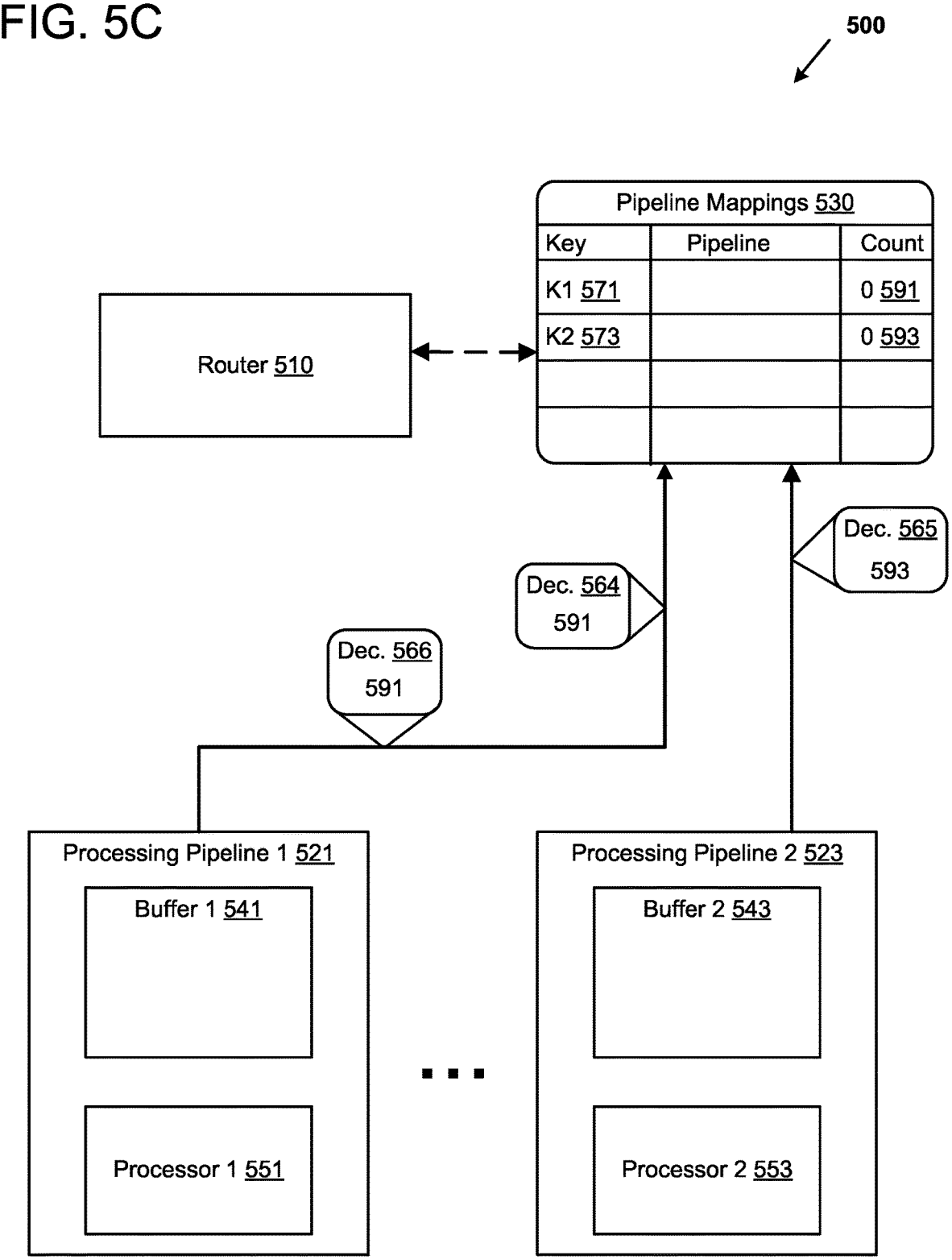

The router 510 creates an entry for the key 573 in the pipeline mappings 530 and creates a counter 593 associated with the key 573. The router 510 selects the processing pipeline 523 based on available capacities of the processing pipelines 521-523 and sends the data item 563 to the processing pipeline 523. For example, the router 510 can analyze available capacities of the buffers 541-543 of the processing pipelines 521-523 and can determine that the buffer 543 of the processing pipeline 523 has a largest available capacity with respect to the other processing pipelines (e.g., 521). In the particular scenario depicted in FIG. 5B, the router 510 determines that the buffer 541 of the processing pipeline 521 contains two data items (561 and 562) and that the buffer 543 of the processing pipeline 523 contains zero data items. The router 510 associates the key 573 with the processing pipeline 523 and then sends the data item 563 to the processing pipeline 523. Sending the data item 563 to the processing pipeline 523 can comprise writing the data item 563 to the buffer 543. As depicted in FIG. 5C, after the processing pipeline 523 processes the data item 563, the counter 593 can be decremented via a decrement operation 565.

When a value of a counter associated with a key has been decremented to a value of zero, it can be determined that no more data items associated with the key are in the plurality of processing pipelines. In at least some embodiments, when a value of a counter is decremented to zero the association between the relevant key and a particular processing pipeline can be removed. For example, in the scenario depicted in FIG. 5C, after the value of the counter 591 is decremented to zero, the association between the key 571 and the processing pipeline 521 is removed from the pipeline mappings 530. Similarly, after the value of the counter 593 is decremented to zero, the association between the key 573 and the processing pipeline 523 is removed from the pipeline mappings 530.

Thus, while at least one data item associated with a given key is in a processing pipeline, all data items associated with the given key will be sent to that pipeline. However, when no data items associated with the given key are received for a period of time long enough to allow for all the data items associated with the given key that are in the processing pipeline to be processed, then the association between the processing pipeline and the key can be removed. If another data item associated with the given key is subsequently received, a different processing pipeline can be selected for processing the data item, based on available capacities of the processing pipelines.

Figure 5D:
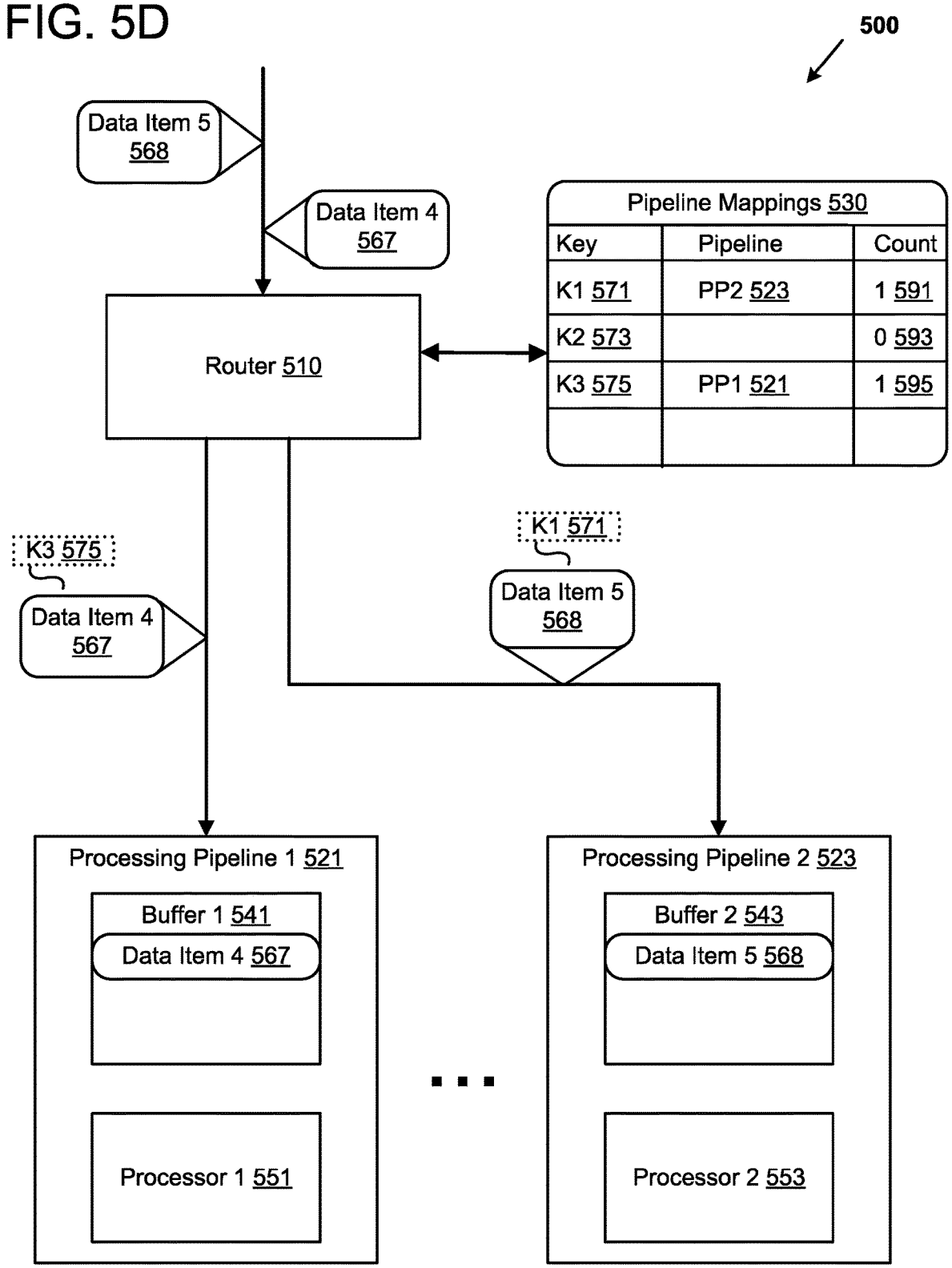

For example, in the scenario depicted in FIG. 5D, another data item 568 that is associated with the key 571 is received after the counter 591 has been decremented to zero and the association between the key 571 and the processing pipeline 521 has been removed. The router 510 can then send the data item 568 to another processing pipeline (e.g., 523) instead of the processing pipeline 521, based on available capacities of the plurality of processing pipelines 521-523. In the particular scenario depicted in FIG. 5D, the router 510 receives a data item 567 and generates a key 575 based on contents of the data item 567. The router 510 determines that no other data item associated with the key 575 is in any of the processing pipelines 521-523 and sends the data item 567 to the processing pipeline 521 based on available capacities of the processing pipelines 521-523. The router 510 also creates an entry in the pipeline mappings 530 for the key 575, associates the entry with the processing pipeline 521, and creates a counter 595 that is also associated with the key 575. The router 510 then increments the counter 595 and transmits the data item 567 to the processing pipeline 521.

The router 510 also receives the data item 568 and generates the key 571 based on contents of the data item 568. The router 510 locates the entry for the key 571 in the pipeline mappings 530 and, based on the value of the counter 591 being equal to zero, determines that no data items associated with the key 571 are in any of the processing pipelines 521-523. The router 510 then selects the processing pipeline 523 based on available capacities of the processing pipelines 521-523 and sends the data item 568 to the processing pipeline 523. The router 510 also associates the processing pipeline 523 with the entry for the key 571 in the pipeline mappings 530 and increments the counter 591. Thus, keys can be associated with different processing pipelines over time but, once a data item associated with the key is sent to a particular pipeline, all other data items associated with the key will be sent to the same pipeline until no more data items associated with the key are present in the pipeline.

Figure 6:
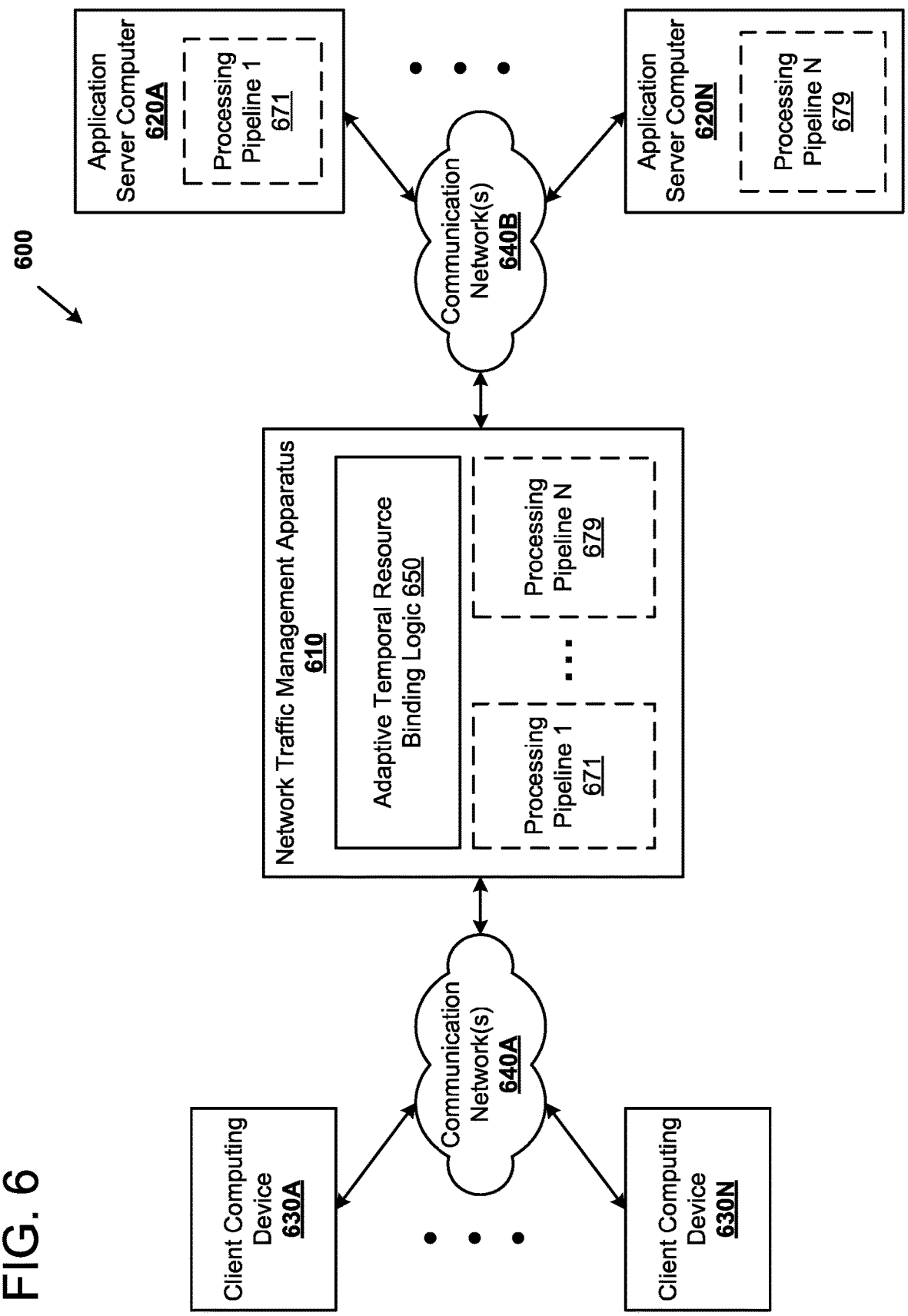
FIG. 6 is a block diagram of an example client-server architecture including a network traffic management apparatus configured for adaptive temporal resource binding of network packets to a plurality of processing pipelines.

FIG. 6 illustrates an example client-server architecture 600 (also referred to as a network traffic management system) that incorporates a network traffic management apparatus 610. The client-server architecture 600 includes a network traffic management apparatus 610 that is coupled to one or more server computers (such as application server computers 620A-N) and one or more client devices (such as client computing devices 630A-N) via one or more communication networks (such as the communication networks 640A and 640B). The server computers 620A-N can communicate with one or more additional server computer(s) that are accessible via the communication networks 640A. As one example, the communication network 640A can include a public network (e.g., the Internet) and devices attached to the network 640A can be accessed using public network addresses; the communication network 640B can include a private network and devices attached to the network 640B can be accessed using private network addresses.

The communication networks 640A-B can include various wired and/or wireless communication technologies, such as a local area network (LAN), a wide area network (WAN), an intranet, the Internet, a public switched telephone network (PSTN), and so forth. The devices connected to the communication networks 640A-B can communicate with each other using various communications protocols, such as transmission control protocol with Internet protocol (TCP/IP) over Ethernet and/or other customized or industry-standard protocols. The communication protocols can be used to transmit information over the networks 640A-B using packet-based messages (e.g., Ethernet-based packet data networks) and/or other application programming interfaces (APIs). An API is a programmatic interface (e.g., a set of methods and/or protocols) for communicating among different modules. The communication networks 640A-B can include various network devices, such as switches (multilayer or single-layer), routers, repeaters, gateways, network bridges, hubs, protocol converters, bridge routers, proxy servers, firewalls, network address translators, multiplexers, network interface controllers, wireless network interface controllers, modems, line drivers, and wireless access points, for example. As illustrated, the network traffic management apparatus 610 is positioned in-line between the client computing devices 630A-N and the server computers 620A-N so that the network traffic management apparatus 610 can intercept all network traffic flowing between the different networks 640A and 640B. In other examples, the network traffic management apparatus 610, the server computers 620A-N, and the client devices 630A-N can be coupled together via other topologies. As one specific example, the server computers 620A-N can be integrated within the network traffic management system 600 (e.g., server computer functions can be implemented in software within one or more devices of the network traffic management apparatus 610). It should be noted that the network topology illustrated in FIG. 6 has been simplified and that multiple networks and networking devices can be utilized to interconnect the various computing systems disclosed herein. Additionally, one or more of the devices of the client-server architecture 600 in these examples can be in a same or a different communication network including one or more public, private, or cloud networks, for example.

Figure 7:
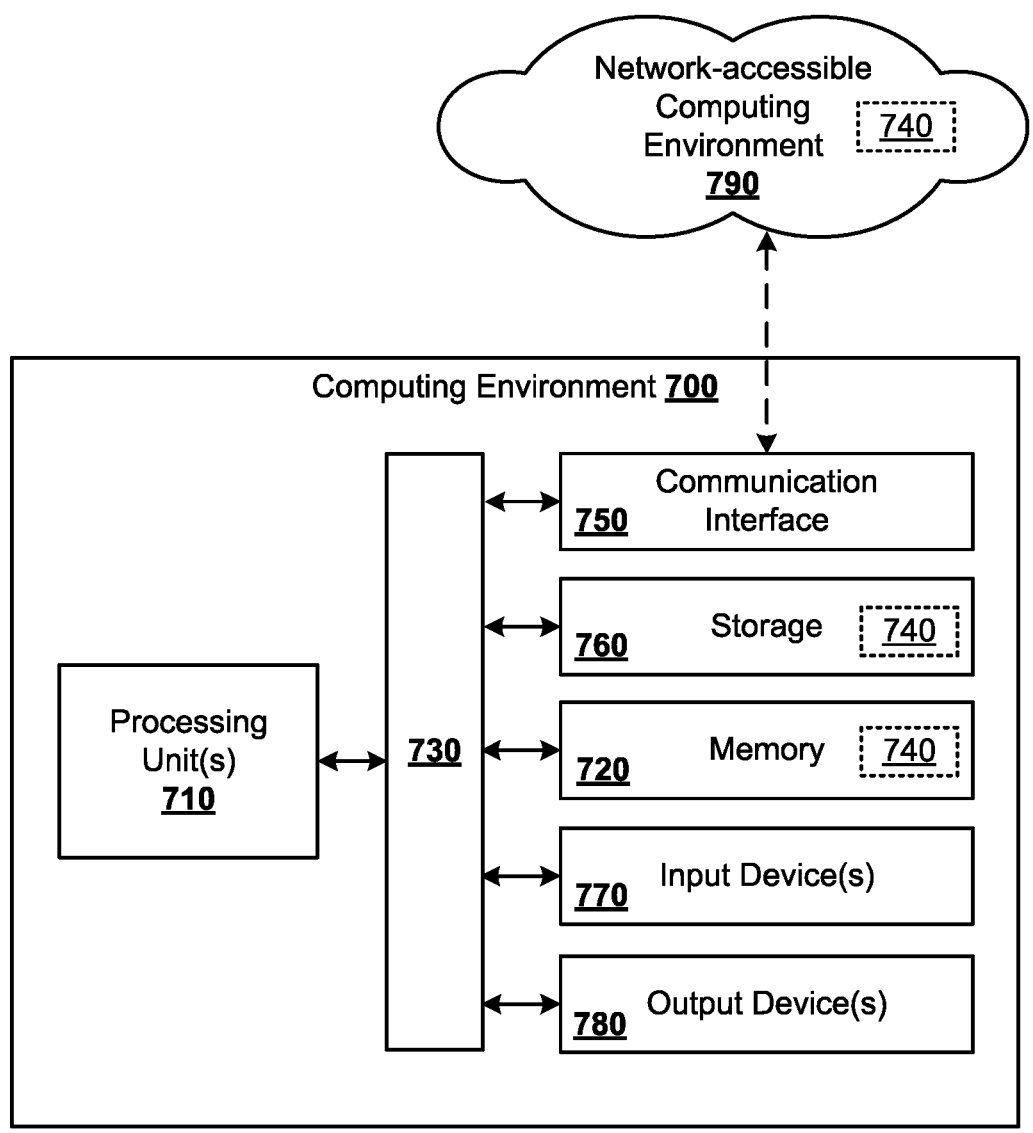
FIG. 7 is a block diagram of an example computing environment, such as can be used for a server computer.

Generally, the server computers 620A-N, the client devices 630A-N, and the network traffic management system 600 can perform various computing tasks that are implemented using a computing environment, such as the computing environment described in more detail with respect to FIG. 7. The computing environment can include computer hardware, computer software, and combinations thereof. As a specific example, the computing environment can include general-purpose and/or special-purpose processor(s), configurable and/or hard-wired electronic circuitry, a communications interface, and computer-readable memory for storing computer-executable instructions to enable the processor(s) to perform a given computing task. The logic to perform a given task can be specified within a single module or interspersed among multiple modules. As used herein, the terms "module" and "component" can refer to an implementation within one or more dedicated hardware devices or apparatus (e.g., computer(s)), and/or an implementation within software hosted by one or more hardware devices or apparatus that may be hosting one or more other software applications or implementations.

The client devices 630A-N can include any type of computing device that can exchange network data, such as mobile communication devices, laptop computers, desktop computers, tablet computers, virtual machines executing within a cloud-computer-based environment, and so forth. The client devices 630A-N can run interface applications, such as web browsers or standalone client applications, which may provide an interface to communicate with (e.g., make requests for, and receive content stored on) one or more of the server computers 620A-N via the communication network(s) 640A and 640B. The client devices 630A-N can further include an output device (such as a display screen or touchscreen (not illustrated)) and/or an input device (such as a keyboard (not illustrated)). Additionally, one or more of the client devices 630A-N can be configured to execute software code (e.g., JavaScript code within a web browser) in order to log client-side data and provide the logged data to the network traffic management apparatus 610 or the server computers 620A-N.

The server computers 620A-N can include any type of computing device that can exchange network data. For example, the server computers 620A-N can exchange network data with the client devices 630A-N and with each other. As another example, the server computers 620A-N can exchange communications along communication paths specified by application logic in order to facilitate a client-server application interacting with the client devices 630A-N. Examples of the server computers 620A-N can include application servers, database servers, access control servers, web servers, and encryption servers. Accordingly, in some examples, one or more of the server computers 620A-N process login and other requests received from the client devices 630A-N via the communication network(s) 640A and 640B according to the Hypertext Transfer Protocol (HTTP) or Hypertext Transfer Protocol Secure (HTTPS) application-layer protocol. A web application may be operating on one or more of the server computers 620A-N and transmitting data (e.g., files or web pages) to the client devices 630A-N (e.g., via the network traffic management apparatus 610) in response to requests from the client devices 630A-N. The server computers 620A-N can be hardware and/or software and may represent a system with multiple servers in a pool, which may include internal or external networks.

While the server computers 620A-N are illustrated as single devices, one or more actions of each of the server computers 620A-N may be distributed across one or more distinct network computing devices that together comprise one or more of the server computers 620A-N. Moreover, the server computers 620A-N are not limited to a particular configuration. Thus, the server computers 620A-N may contain network computing devices that operate using a coordinated approach, whereby one of the network computing devices of the server computers 620A-N operate to manage or otherwise coordinate operations of the other network computing devices. Each of the server computers 620A-N can operate as a networked computing device within a cluster architecture, a computing device within a peer-to peer architecture, a virtual machine, or a resource within a cloud-based computer architecture, for example. Thus, the technology disclosed herein is not to be construed as being limited to a single environment and other configurations and architectures are also envisaged. For example, one or more of the server computers 620A-N can operate within the network traffic management apparatus 610 itself rather than as a stand-alone server device communicating with the network traffic management apparatus 610 via communication network 640B. In this example, the one or more of the server computers 620A-N operate within the memory of the network traffic management apparatus 610.

The network traffic management apparatus 610 can include any type of computing device that can be used for managing network traffic. The network traffic management apparatus 610 can perform a number of functions, including providing network security, access control, load balancing network traffic across the server computers 620A-N, and/or accelerating network traffic associated with an application hosted by one or more of the server computers 620A-N, for example. Such functions can be performed by one or more services. These services can be incorporated into workloads that are executed by the network traffic management apparatus 610. For example, the network traffic management apparatus 610 can include a workload that is used to perform proxy and other services on behalf of the server 620A-N and to manage traffic between the clients 630A-N and the servers 620A-N. Additionally, the network traffic management apparatus 610 can include other network devices such as one or more routers or switches, for example.

The network traffic management apparatus 610 can include adaptive temporal resource binding logic 650 as described above with reference to FIGS. 1-5. In some embodiments, the network traffic management apparatus 610 can include one or more processing pipelines 671-679. Additionally or alternatively, the one or more processing pipelines 671-679 can be included in the application server computers 620A-N.

While the network traffic management apparatus 610 is illustrated in this example as including a single device, the network traffic management apparatus 610 in other examples can include a plurality of devices or blades each having one or more processors (each processor with one or more processing cores) that implement one or more components of this technology. In these examples, one or more of the devices can have a dedicated communication interface or memory. Alternatively, one or more of the devices can utilize the memory, communication interface, or other hardware or software components of one or more other devices included in the network traffic management apparatus 610. Additionally, the network traffic management apparatus 610 and/or the application(s) executed by the network traffic management apparatus 610 can be operative in a cloud-based computing environment. The application(s) can be executed within or as virtual machine(s) or virtual server(s) that can be managed in a cloud-based computing environment. For example, the application(s), and even the network traffic management apparatus 610 itself, can be located in virtual server(s) running in a cloud-based computing environment rather than being tied to one or more specific physical network computing devices. Also, the application(s) can be running in one or more virtual machines (VMs) executing on the network traffic management apparatus 610. Additionally, in one or more examples of this technology, virtual machine(s) running on the network traffic management apparatus 610 can be managed or supervised by a hypervisor. Additionally, one or more of the components that together comprise the network traffic management apparatus 610 can be standalone devices or integrated with one or more other devices or apparatuses, such as with one or more of the server computers 620A-N, for example.

Additionally, one or more of the components depicted in the client-server architecture 600, such as the network traffic management apparatus 610, server computers 620A-N, or client computing devices 630A-N, for example, may be configured to operate as virtual instances on the same physical machine. In other words, one or more of the network traffic management apparatus 610, server computers 620A-N, or client computing devices 630A-N may operate on the same physical device rather than as separate devices communicating through communication networks 640A and 640B. Additionally, there may be more or fewer network traffic management apparatuses, client computing devices, or server computers than illustrated in FIG. 6.

FIG. 7 illustrates a block diagram of a generalized example of a suitable computing environment 700 that can be used to implement the examples, techniques, and technologies described herein. For example, the computing environment 700 can be used to implement a computing device (such as a network traffic management apparatus) that performs techniques for adaptive temporal resource binding as described herein.

The computing environment 700 includes at least one processing unit 710 and computer-readable memory 720, which are coupled together by an interconnect 730. The processing unit 710 executes computer-executable instructions. The processing unit 710 can include a general-purpose processor, a special-purpose processor, and combinations thereof. For example, the processing unit 710 can include a general-purpose central processing unit (CPU), a graphics processor, a processor in an application-specific integrated circuit (ASIC), a processor configured to operate using programmable logic (such as in a field-programmable gate array (FPGA)), and/or any other type of processor. In a multi-processing system, multiple processing units can be used to execute computer-executable instructions to increase processing power.

The memory 720 stores software 740 implementing one or more innovations described herein, in the form of computer-executable instructions suitable for execution by the processing unit 710. Specifically, the memory 720 can be used to store computer-executable instructions, data structures, input data, output data, and other information. The memory 720 can include volatile memory (e.g., registers, cache, random-access memory (RAM)), non-volatile memory (e.g., read-only memory (ROM), electrically erasable programmable ROM (EEPROM), and flash memory), and/or combinations thereof. The memory 720 can include operating system software (not illustrated). Operating system software can provide an operating environment for other software executing in the computing environment 700 and can coordinate activities of the components of the computing environment 700.

The interconnect 730 is used to connect different components of the computing environment 700 together so that the processing unit 710 can communicate with the different components and/or so that the different components can communicate with each other. For example, the interconnect 730 can include a bus, controller, and/or a network. As one example, the interconnect 730 can include a host bridge (also referred to as a northbridge) for connecting the processing unit 710 to relatively high-speed components (such as the memory 720) and an input/output bridge (also referred to as a southbridge) for connecting to relatively lower-speed components (such as a communications interface 750) within the computing environment 700. In some examples, one or more components of the computing environment 700 can be integrated within or connected directly to the processing unit 710.

The computing environment 700 can include a communication interface 750 for communicating with another computing entity using a communication medium (e.g., a physical layer). The communication interface 750 can implement all or a portion of a network protocol stack. The network protocol stack defines communication formats and rules for communicating between different devices connected to a network. For example, the network protocol stack can define modular layers for communication using the Open Systems Interconnection (OSI) model or another model (such as the Internet Protocol Suite). The OSI model standardizes and partitions a communication system into seven layers including a physical layer (referred to as layer 1) and an application layer (referred to as layer 7). The application layer can be used to define how applications access the communications subsystem. The physical layer defines the electrical and physical specifications for communication over a communication medium (also referred to as a physical transmission medium). The communication medium can be used to convey information, such as computer-executable instructions or other data, in a modulated data signal. A modulated data signal is a signal that has one or more of its characteristics adjusted in such a manner as to encode information in the signal. The communication interface 750 can include electronic and/or optical circuitry to receive and transmit communications signals that are encoded (e.g., according to a physical layer specification of the network stack) using an electrical, optical, radio frequency (RF), or another carrier signal. Accordingly, the communication interface 750 can be used to communicate over wired connections (e.g., twisted-wire pair, coaxial cable, and fiber optic connections) and/or wireless technologies (e.g., Bluetooth, Wi-Fi (IEEE 802.11), and cellular).

As a specific example with reference to FIG. 6, a communication interface of the network traffic management apparatus 610 operatively couples to and communicates with the communication networks 640A and 640B so that the network traffic management apparatus 610 is coupled to and can communicate with the server computers 620A-N and the client computing devices 630A-N.

The computing environment 700 can include storage 760 that is used to store instructions for the software 740, data structures, and data, which can be used to implement the technologies described herein. The storage 760 can include electronic circuitry for reading and/or writing to removable or non-removable storage media using magnetic, optical, or other reading and writing system that is coupled to the processor. The storage 760 can include read-only storage media and/or readable and writeable storage media, such as magnetic disks, solid state drives, magnetic tapes or cassettes, CD-ROMs, CD-RWs, DVDs, or any other medium which can be used to store information and that can be accessed within the computing environment 700.

The computing environment 700 can include input device(s) 770. For example, the input device(s) 770 can provide an input interface to a user of the computing environment 700 and/or to receive inputs from a physical environment. The input device(s) 770 can include a tactile input device (e.g., a keyboard, a mouse, or a touchscreen), a microphone, a camera, a sensor, or another device that provides input to the computing environment 700.

The computing environment 700 can include output device(s) 780. For example, the output device(s) 780 can provide an output interface to a user of the computing environment 700 and/or to generate an output observable in a physical environment. The output device(s) 780 can include a light-emitting diode, a display, a printer, a speaker, a CD-writer, or another device that provides output from the computing environment 700. In some examples, the input device(s) 770 and the output device(s) 780 can be used together to provide a user interface to a user of the computing environment 700.

The computing environment 700 is not intended to suggest limitations as to scope of use or functionality of the technology, as the technology can be implemented in diverse general-purpose and/or special-purpose computing environments. For example, the disclosed technology can be practiced in a local, distributed, and/or network-enabled computing environment. In distributed computing environments, tasks are performed by multiple processing devices. Accordingly, principles and advantages of distributed processing, such as redundancy, parallelization, and replication also can be implemented, as desired, to increase the robustness and performance of the devices and systems of the examples. The examples may also be implemented on computer system(s) that extend across any suitable network using any suitable interface mechanisms and traffic technologies, including by way of example only, wireless traffic networks, cellular traffic networks, Packet Data Networks (PDNs), the Internet, intranets, and combinations thereof. As a specific example, a distributed computing environment can include the processing unit 710 and the network-accessible computing environment 790 that is linked through a communications network. In a distributed computing environment, program modules 740 (including executable instructions for performing operations as described herein) can be located in both local and remote memory storage devices.

The term computer-readable media includes non-transient media for data storage, such as memory 720 and storage 760, and does not include transmission media such as modulated data signals and carrier waves. Any of the disclosed methods can be implemented as computer-executable instructions stored on one or more computer-readable media and executed on a computer (e.g., any commercially available computer). Any of the computer-executable instructions for implementing the disclosed techniques as well as any data structures and data created and used during implementation of the disclosed embodiments can be stored on one or more computer-readable storage media. For example, the computer-executable instructions can be part of a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network, or other such network) using one or more network-attached computers.

This disclosure is set forth in the context of representative examples that are not intended to be limiting. Accordingly, this disclosure is directed toward all novel and non-obvious features and aspects of the various disclosed examples, alone and in various combinations and sub-combinations with one another. Many variations of the specific hardware and software used to implement the examples are possible, as will be appreciated by those skilled in the relevant art with the benefit of this disclosure. The disclosed systems, methods, and apparatus are not limited to any specific aspect or feature or combinations thereof, nor does the disclosed technology require that any one or more specific advantages be present or problems be solved. Theories of operation, scientific principles, or other theoretical descriptions presented herein in reference to the disclosed technology have been provided for the purposes of better understanding and are not intended to be limiting in scope. The apparatus and methods in the appended claims are not limited to those apparatus and methods that function in the manner described by such theories of operation.

As used in this application the singular forms "a," "an," and "the" include the plural forms unless the context clearly dictates otherwise. The term "coupled" encompasses mechanical, electrical, magnetic, optical, as well as other practical ways of coupling or linking items together and does not exclude the presence of intermediate elements between the coupled items. The term "and/or" means any one item or combination of items in the phrase.

The recited order of processing elements or sequences, or the use of numbers, letters, or other designations therefore is not intended to limit the claimed processes to any order. Although the operations of some of the disclosed methods are described in a particular, sequential order for convenient presentation, it should be understood that this manner of description encompasses rearrangement, unless a particular ordering is required by specific claim language set forth below. For example, operations described sequentially may in some cases be rearranged or performed concurrently. Moreover, for the sake of simplicity, the attached figures may not show all the various ways in which the disclosed methods can be used in conjunction with other methods.

It should also be well understood that any software functionality described herein can be performed, at least in part, by one or more hardware logic components, instead of software. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), and so forth.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, assembly language, or any other suitable programming language. Likewise, the disclosed technology is not limited to any particular computer or type of hardware. Certain details of suitable computers and hardware are well-known and need not be set forth in detail in this disclosure.

Having thus described many possible embodiments to which the principles of the invention may be applied, it will be recognized by those skilled in the art that the foregoing detailed disclosure is intended to be presented by way of example only and is not limiting. Various alterations, improvements, and modifications will occur and are intended to those skilled in the art, though not expressly stated herein. These alterations, improvements, and modifications are intended to be suggested hereby, and are within the spirit and scope of the invention. Accordingly, the scope of the claimed subject matter is defined by the following claims. We therefore claim as our invention all that comes within the scope of these claims.

What is claimed is:

1. A system for routing network packets to a plurality of processing pipelines, the system comprising:
   a plurality of processing pipelines;
   a processor; and
   one or more computer-readable media comprising programmed instructions stored thereon, the system configured to execute the programmed instructions to:
     generate a key based on contents of a network packet received via a network;
     increment a counter associated with the key when a network packet associated with the key is sent to a processing pipeline, of the plurality of processing pipelines;
     decrement the counter upon the network packet associated with the key being processed by the processing pipeline, of the plurality of processing pipelines;
     determine whether another network packet associated with the key is in the processing pipeline, of the plurality of processing pipelines, based on a value of the counter;
     send the network packet to the processing pipeline, of the plurality of processing pipelines, if another network packet associated with the key is in the processing pipeline, of the plurality of processing pipelines; and otherwise, send the network packet to one of the plurality of processing pipelines based on available capacities of the plurality of processing pipelines.

2. The system of claim 1, wherein:
the key is generated using data in a header of the network packet.

3. The system of claim 1, wherein:
the key comprises a hash value based on contents of the network packet that is generated using a hashing algorithm.

4. The system of claim 1, wherein sending the network packet to one of the plurality of processing pipelines based on available capacities of the plurality of processing pipelines comprises:
identifying a processing pipeline, of the plurality of processing pipelines, with a buffer containing a fewest number of network packets with respect to other processing pipelines in the plurality of processing pipelines; and
sending the network packet to the identified processing pipeline, of the plurality of processing pipelines.

5. A computer-implemented method for sending data items to a plurality of processing pipelines, the method comprising:
generating a key based on contents of a data item received at a computing device connected to a plurality of processing pipelines;
incrementing a counter associated with the key when a data item associated with the key is sent to a processing pipeline, of the plurality of processing pipelines;
decrementing the counter after the data item associated with the key is processed by the processing pipeline, of the plurality of processing pipelines;
determining whether another data item associated with the key is in the processing pipeline, of the plurality of processing pipelines, based on a value of the counter;
sending the data item to the processing pipeline, of the plurality of processing pipelines, if another data item associated with the key is in the processing pipeline, of the plurality of processing pipelines; and
otherwise, sending the data item to one of the plurality of processing pipelines based on available capacities of the plurality of processing pipelines.

6. The method of claim 5, wherein:
the data item comprises a network packet; and
generating the key comprises generating an identifier based on data in a header of the network packet.

7. The method of claim 5, wherein:
generating the key comprises using a hashing algorithm to generate a hash value based on contents of the data item.

8. The method of claim 5, wherein sending the data item to one of the plurality of processing pipelines based on available capacities of the plurality of processing pipelines comprises:
identifying a processing pipeline, of the plurality of processing pipelines, with a buffer containing a fewest number of data items with respect to other processing pipelines in the plurality of processing pipelines; and
sending the data item to the identified processing pipeline, of the plurality of processing pipelines.

9. A non-transitory computer readable medium having stored thereon instructions comprising executable code that, when executed by one or more processors, causes the one or more processors to perform operations, the operations comprising:
generating a key based on contents of a network packet received via a computer network;
incrementing a counter associated with the key when a network packet associated with the key is sent to a processing pipeline, of the plurality of processing pipelines;
decrementing the counter after the network packet associated with the key is processed by the processing pipeline, of the plurality of processing pipelines;
determining whether another network packet associated with the key is in the processing pipeline, of a plurality of processing pipelines, based on a value of the counter;
sending the network packet to the processing pipeline, of the plurality of processing pipelines, if another network packet associated with the key is in the processing pipeline, of the plurality of processing pipelines; and
otherwise, sending the network packet to one of the plurality of processing pipelines based on available capacities of the plurality of processing pipelines.

10. The non-transitory computer readable medium of claim 9, wherein:
generating the key comprises generating an identifier based on data in a header of the network packet.

11. The non-transitory computer readable medium of claim 9, wherein:
generating the key comprises using a hashing algorithm to generate a hash value based on contents of the network packet.

12. The non-transitory computer readable medium of claim 9, wherein sending the network packet to one of the plurality of processing pipelines based on available capacities of the plurality of processing pipelines comprises:
identifying a processing pipeline, of the plurality of processing pipelines, with a buffer containing a fewest number of network packets with respect to the other processing pipelines in the plurality of processing pipelines; and
sending the network packet to the identified processing pipeline.

13. An apparatus, comprising:
a processor; and
one or more computer-readable media comprising programmed instructions stored thereon, the apparatus configured to execute the programmed instructions to:
generate a key based on contents of a network packet received via a computer network;
increment a counter associated with the key when a network packet associated with the key is sent to a processing pipeline, of the plurality of processing pipelines;
decrement the counter after the network packet associated with the key is processed by the processing pipeline, of the plurality of processing pipelines;
determine whether another network packet associated with the key is in the processing pipeline, of a plurality of processing pipelines, based on a value of the counter;
send the network packet to the processing pipeline, of the plurality of processing pipelines, if another network packet associated with the key is in a processing pipeline, of the plurality of processing pipelines; and
otherwise, send the network packet to one of the plurality of processing pipelines based on available capacities of the plurality of processing pipelines.

14. The apparatus of claim 13, wherein:
the key is generated using data in a header of the network packet.

15. The apparatus of claim 13, wherein:
the key comprises a hash value based on contents of the network packet that is generated using a hashing algorithm.

16. The apparatus of claim 13, wherein sending the network packet to one of the plurality of processing pipelines based on available capacities of the plurality of processing pipelines comprises:
identifying a processing pipeline, of the plurality of processing pipelines, with a buffer containing a fewest number of network packets with respect to other processing pipelines in the plurality of processing pipelines; and
sending the network packet to the identified processing pipeline, of the plurality of processing pipelines.

\* \* \* \* \*